(12) United States Patent
Kim et al.

(10) Patent No.: US 10,298,782 B2
(45) Date of Patent: May 21, 2019

(54) ELECTRONIC DEVICE AND METHOD FOR PROCESSING DATA USING FIRST AND SECOND PROCESSORS

(71) Applicant: SAMSUNG ELECTRONICS CO., LTD., Suwon-si, Gyeonggi-do (KR)

(72) Inventors: Sungsoon Kim, Seoul (KR); Yongchan Keh, Seoul (KR); Hyowon Kim, Bucheon-si (KR); Byeonghoon Park, Suwon-si (KR); Kisuk Sung, Yongin-si (KR); Jungkee Lee, Osan-si (KR); Kihuk Lee, Suwon-si (KR); Changryong Heo, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 203 days.

(21) Appl. No.: 15/388,104

(22) Filed: Dec. 22, 2016

(65) Prior Publication Data
US 2017/0223198 A1   Aug. 3, 2017

(30) Foreign Application Priority Data
Feb. 2, 2016   (KR) ........................ 10-2016-0012995

(51) Int. Cl.
| | |
|---|---|
| *H04N 5/235* | (2006.01) |
| *H04N 1/00* | (2006.01) |
| *H04L 29/06* | (2006.01) |
| *H04L 29/08* | (2006.01) |
| *H04N 5/04* | (2006.01) |
| *H04N 5/232* | (2006.01) |
| *H04L 7/00* | (2006.01) |
| *H04L 12/26* | (2006.01) |

(52) U.S. Cl.
CPC ......... *H04N 1/00204* (2013.01); *H04L 69/22* (2013.01); *H04L 69/324* (2013.01); *H04N 5/04* (2013.01); *H04N 5/232* (2013.01); *H04N 5/23293* (2013.01); *H04L 7/0008* (2013.01); *H04L 43/16* (2013.01); *H04N 2201/0084* (2013.01)

(58) Field of Classification Search
CPC .................................................. H04N 1/00204
See application file for complete search history.

(56) References Cited

U.S. PATENT DOCUMENTS

| | | | | |
|---|---|---|---|---|
| 6,161,168 | A * | 12/2000 | Kametani | G06F 15/167 711/147 |
| 6,650,365 | B1 * | 11/2003 | Sato | H04N 1/32112 348/231.3 |
| 7,982,795 | B2 * | 7/2011 | Spatharis | G06F 17/30265 348/239 |
| 7,986,350 | B2 * | 7/2011 | Jang | H04N 5/232 348/231.3 |

(Continued)

*Primary Examiner* — Gary C Vieaux
(74) *Attorney, Agent, or Firm* — Nixon & Vanderhye P.C.

(57) ABSTRACT

An electronic device and data processing method thereof is provided. The electronic device of the present disclosure includes a first processor which acquires image data from a camera and generates a data frame based on the image data and a second processor which receives the data frame from the first processor, checks attribute information of the data frame, and supplies information on the data frame to at least one of a plurality of applications corresponding to the attribute information.

18 Claims, 11 Drawing Sheets

(56) References Cited

U.S. PATENT DOCUMENTS

| | | | |
|---|---|---|---|
| 2014/0294237 A1* | 10/2014 | Litvak | G06K 9/00375 382/103 |
| 2015/0055004 A1* | 2/2015 | Nakamura | G06F 3/0488 348/333.02 |

* cited by examiner

ELECTRONIC DEVICE AND METHOD FOR PROCESSING DATA USING FIRST AND SECOND PROCESSORS

CROSS-REFERENCE TO RELATED APPLICATION

The present application is based on and claims priority under 35 U.S.C. § 119 to a Korean patent application filed on Feb. 2, 2016 in the Korean intellectual property office and assigned serial number 10-2016-0012995, the disclosure of which is incorporated by reference herein in its entirety.

TECHNICAL FIELD

The present disclosure relates generally to an electronic device and data processing method thereof.

BACKGROUND

Electronic devices such as smartphones, tablet personal computers (PCs), and laptop PCs are growing in popularity and valued for their convenience and portability in various fields. Most of such devices are equipped with a camera. More recently, interest in 3-dimensional (3D) cameras has been increasing rapidly, and the number of 3D camera-equipped electronic devices is growing.

The 3D camera has been developed as different types such as a stereoscopic camera, a time-of-flight (TOF) camera, a structure light camera, and an arrayed camera. The 3D cameras are capable of measuring various types of information including depth in addition to a 2-dimensional (2D) image. A 3D camera-equipped electronic device is capable of providing a user with a 3D image using the various types of information acquired by means of the 3D camera.

In order to process various data collected by the 3D camera, a powerful computation capability is required. For example, triangular calculation, computer vision process, and Red-Green-Blue (RGB) camera mapping or registration are all high computational capability-requiring processes. For this reason, it is a minimum requirement for a 3D camera-equipped electronic device to be equipped with a high performance Graphic Processing Unit (GPU) and Digital Signal Processor (DSP).

However, the processors installed in legacy electronic devices are lacking in terms of 3D camera data processing capability. Such a capability shortage may lead to a significant processing overload.

SUMMARY

The present disclosure provides an electronic device and data processing method thereof for efficiently processing 3D camera data.

In accordance with an example aspect of the present disclosure, an electronic device is provided. The electronic device includes a first processor configured to acquire image data from a camera and to generate a data frame based on the image data and a second processor configured to receive the data frame from the first processor, to check attribute information of the data frame, and to supply information on the data frame to at least one of a plurality of applications corresponding to the attribute information.

In accordance with another example aspect of the present disclosure, a data processing method of an electronic device is provided. The data processing method includes acquiring, at a first processor, image data from a camera; generating, at the first processor, a data frame based on the image data; providing the data frame to a second processor; checking, at the second processor, attribute information of the data frame; and supplying information on the data frame to at least one of a plurality of applications corresponding to the attribute information.

In accordance with still another example aspect of the present disclosure, a computer-readable storage medium storing a program for executing a data processing method is provided. The data processing method includes acquiring, at a first processor, image data from a camera; generating, at the first processor, a data frame based on the image data; providing the data frame to a second processor; checking, at the second processor, attribute information of the data frame; and supplying information on the data frame to at least one of a plurality of applications corresponding to the attribute information.

BRIEF DESCRIPTION OF THE DRAWINGS

The above and other aspects, features and attendant advantages of the present disclosure may be more readily understood and appreciated from the following detailed description, taken in conjunction with the accompanying drawings, in which like reference numerals refer to like elements, and wherein.

DETAILED DESCRIPTION

Figure 1:
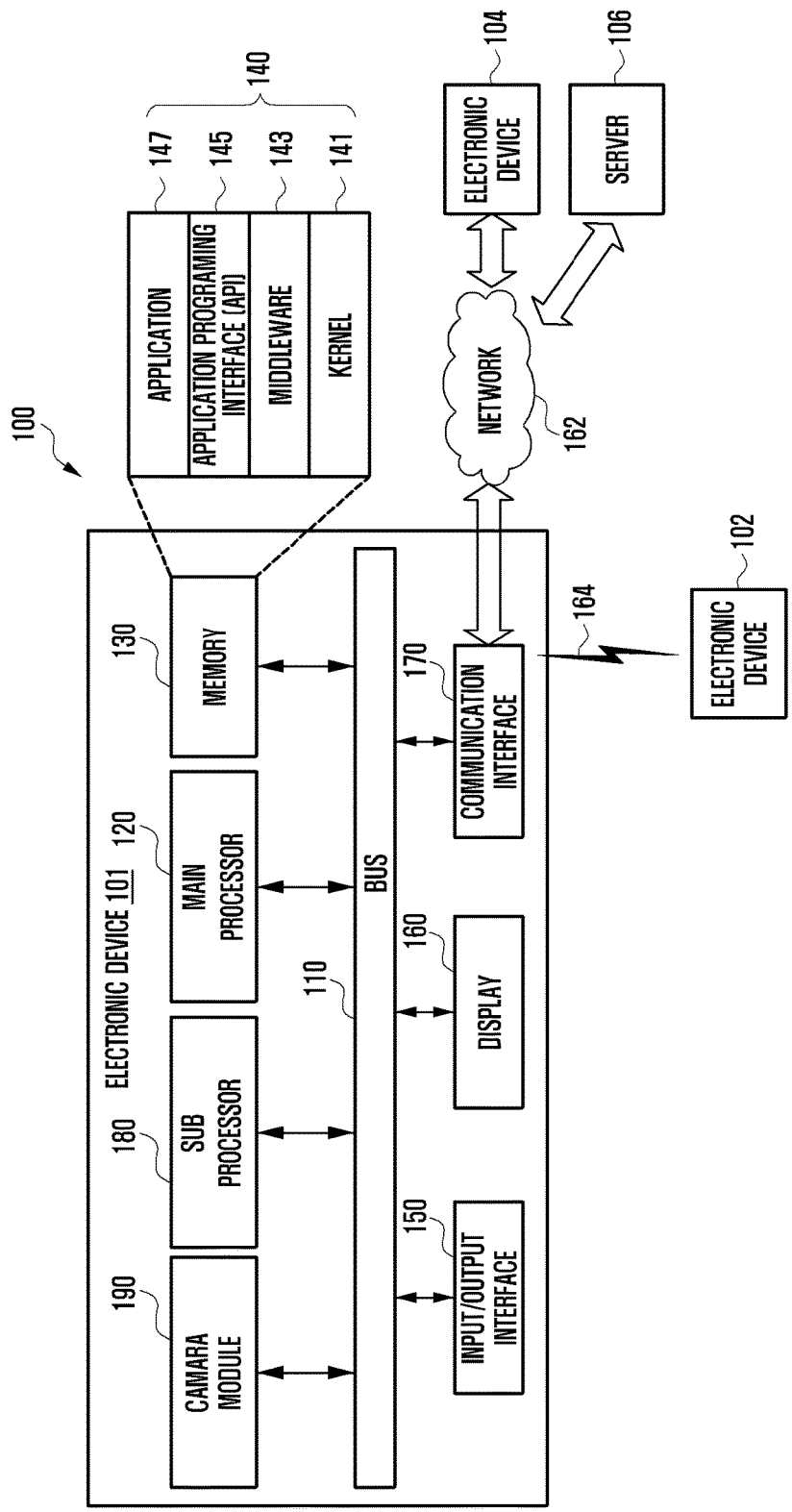
FIG. 1 is a diagram illustrating an example network environment including example electronic devices according to various example embodiments of the present disclosure.

Hereinafter, various example embodiments of the present disclosure are described in greater detail with reference to the accompanying drawings. In the following description of embodiments, descriptions of well-known functions and structures incorporated herein may be omitted to avoid obscuring the subject matter of the present disclosure and for clarity and conciseness.

The following description with reference to the accompanying drawings is provided to assist in an understanding of embodiments of the present disclosure as defined by the claims and their equivalents. The following description includes various specific details to assist in that understanding but these are to be regarded as mere examples. Various changes and modifications of the embodiments described herein can be made without departing from the scope and spirit of the present disclosure.

Expressions such as "include" and "may include", as used herein, may indicate the presence of the disclosed functions, operations, and constituent elements, but do not limit one or more additional functions, operations, and constituent elements. Herein, terms such as "include" and/or "have" may be construed to indicate a certain characteristic, number, step, operation, constituent element, component or a combination thereof, but may not be construed to exclude the existence of, or a possibility of, one or more other additional characteristics, numbers, steps, operations, constituent elements, components or combinations thereof.

In the present disclosure, the expression "and/or" includes any and all combinations of the associated listed words. For example, the expression "A and/or B" may include A, include B, or both A and B.

In the present disclosure, expressions including ordinal numbers, such as "first" and "second," etc., may modify various elements. However, such elements are not limited by the above expressions. For example, the above expressions do not limit the sequence and/or importance of the elements. The above expressions merely distinguish an element from the other elements. For example, a first user device and a second user device indicate different user devices although both devices are user devices. For example, a first element could be referred to as a second element, and similarly, a second element could also be referred to as a first element without departing from the scope of the present disclosure.

When is referred to as being "connected" to or "accessed" by to other component, not only is the component directly connected to or accessed by the other component, but also there may exist another component between them. Meanwhile, when a component is referred to as being "directly connected" or "directly accessed" to other component, it should be understood that there is no component therebetween.

The terms used in the present disclosure are merely used to describe specific embodiments of the present disclosure, and are not intended to limit the present disclosure. As used herein, the singular forms of terms are intended to include the plural forms as well, unless the context clearly indicates otherwise.

In this disclosure, an electronic device may be able to perform a communication function. For example, an electronic device may be a smart phone, a tablet personal computer (PC), a mobile phone, a video phone, an e-book reader, a desktop PC, a laptop PC, a netbook computer, a personal digital assistant (PDA), a portable multimedia player (PMP), a Moving Picture Experts Group (MPEG) audio layer 3 (MP3) player, a portable medical device, a digital camera, or a wearable device (e.g., a head-mounted device (HMD) such as electronic glasses, electronic clothes, an electronic bracelet, an electronic necklace, an electronic appcessory, or a smart watch), or the like, but is not limited thereto.

According to some embodiments of the present disclosure, an electronic device may be a smart home appliance that involves a communication function. For example, an electronic device may be a television (TV), a digital video disk (DVD) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, etc.), a game console, an electronic dictionary, an electronic key, a camcorder, or an electronic picture frame, or the like, but is not limited thereto.

According to some embodiments of the present disclosure, an electronic device may be a medical device (e.g., magnetic resonance angiography (MRA), magnetic resonance imaging (MRI), computed tomography (CT), ultrasonography, etc.), a navigation device, a global positioning system (GPS) receiver, an event data recorder (EDR), a flight data recorder (FDR), a car infotainment device, electronic equipment for a ship (e.g., a marine navigation system, a gyrocompass, etc.), avionics, security equipment, or an industrial or home robot, or the like, but is not limited thereto.

According to some embodiments of the present disclosure, an electronic device may be furniture or part of a building or construction having a communication function, an electronic board, an electronic signature receiving device, a projector, or various measuring instruments (e.g., a water meter, an electric meter, a gas meter, a wave meter, etc.), or the like, but is not limited thereto. An electronic device disclosed herein may be one of the above-mentioned devices or any combination thereof. The above-mentioned electronic devices are merely listed as examples and not to be considered as a limitation of this disclosure.

FIG. 1 is a diagram illustrating an example network environment including electronic devices according to various example embodiments of the present disclosure.

In reference to FIG. 1, the network environment 100 includes the electronic device 101. The electronic device 101 may include a bus 110, a main processor (e.g., including processing circuitry) 120, a memory 130, an input/output interface (e.g., including input/output circuitry) 150, a display 160, a communication interface (e.g., including communication circuitry) 170, a sub-processor (e.g., including processing circuitry) 180, and a camera module (e.g., including a camera) 190.

The bus 110 may be a circuit designed for connecting the above-discussed elements and communicating data (e.g., a control message) between such elements.

The main processor 120 may include various processing circuitry configured to receive commands from the other elements (e.g., the memory 130, the input/output interface 150, the display 160, or the communication interface 170, etc.) through the bus 110, interpret the received commands, and perform the arithmetic or data processing based on the interpreted commands.

The memory 130 may store therein commands or data received from or created at the main processor 120 or other elements (e.g., the input/output interface 150, the display 160, or the communication interface 170, etc.). The memory 130 may include programming modules 140 such as a kernel 141, a middleware 143, an application programming interface (API) 145, and an application 147. Each of the programming modules may be composed of software, firmware, hardware, and any combination thereof.

The kernel 141 may control or manage system resources (e.g., the bus 110, the main processor 120, the memory 130, etc.) used to execute operations or functions implemented by other programming modules (e.g., the middleware 143, the API 145, and the application 147). Also, the kernel 141 may provide an interface capable of accessing and controlling or managing the individual elements of the electronic device 101 by using the middleware 143, the API 145, or the application 147.

The middleware 143 may operate between the kernel 141 and either one or both of the API 145 and the application 147, in such a manner that the API 145 or the application 147 communicates with the kernel 141 and exchanges data therewith. Also, in relation to work requests received from one or more applications 147 and/or the middleware 143, for example, may perform load balancing of the work requests by using a method of assigning a priority, in which system resources (e.g., the bus 110, the main processor 120, the memory 130, etc.) of the electronic device 101 can be used, to at least one of the one or more applications 147.

The API 145 is an interface through which the application 147 is capable of controlling a function provided by the kernel 141 or the middleware 143, and may include, for example, at least one interface or function for file control, window control, image processing, character control, and the like.

The input/output interface 150 may include various input/output circuitry configured to deliver commands or data, entered by a user through an input/output unit (e.g., including various input/output circuitry, such as, for example, and without limitation, a sensor, a keyboard, or a touch screen), to the main processor 120, the memory 130, or the communication interface 170 via the bus 110.

The display module 160 may include, for example, a liquid crystal display (LCD), a light emitting diode (LED) display, an organic LED (OLED) display, a micro electro mechanical system (MEMS) display, or an electronic paper display, or the like, but is not limited thereto. The display 160 may display various types of contents (e.g., text, images, videos, icons, or symbols) for users. The display module 160 may include a touch screen, and may receive, for example, a touch, gesture, proximity, or hovering input by using an electronic device or a part of the user's body.

The communication interface 170 may include various communication circuitry and may perform a communication between the electronic device 101 and any external electronic device (e.g., the electronic device 104 of the server 106). For example, the communication interface 170 may communicate with any external device by being connected with a network 162 through a wired or wireless communication or via short-range wireless communication 164.

The wireless communication may include, but not limited to, at least one of Wi-Fi, Bluetooth (BT), near field communication (NFC), global navigation satellite system (GNSS), or a cellular communication (e.g., long-term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), etc.).

GNSS may include at least one of GPS, global navigation satellite system (Glonass), Beidou Navigation Satellite System (Beidou), Galileo, or the European global satellite-based navigation system. The terms "GPS" and the "GNSS" may be used interchangeably herein.

The wired communication may include, but not limited to, at least one of universal serial bus (USB), high definition multimedia interface (HDMI)), recommended standard 232 (RS-232), or plain old telephone service (POTS).

The network 162 includes, as a telecommunications network, at least one of a computer network (e.g., a local area network (LAN) or a wide area network (WAN)), the Internet, and a telephone network.

The sub-processor 180 may include various processing circuitry and be an exclusive processor for processing data from the camera module 190. For example, the sub-processor 180 may be a specialized processor for processing 3D image data that has a heavy processing load. For example, the sub-processor 180 may be implemented as various processing circuitry, such as, for example, and without limitation, a dedicated processor, a CPU, an Application-Specific Integrated Circuit (ASIC), or the like. The sub-processor 180 may generate the 3D data requested by the main processor 120 based on the raw data received from the camera module 190. The sub-processor 180 may generate data frames based on the 3D data and transmit the data frames to the main processor 120.

According to an embodiment, the sub-processor 180 may acquire censor data at the time of acquiring 3D data. For example, the sub-processor 180 may acquire the location information (e.g., X, Y, and Z coordinates) and posture information (e.g., orientation (landscape or portrait), rotation, and movement) of the electronic device 101 or an external camera module by various sensors (e.g., gyro sensor, geomagnetic sensor, and acceleration sensor). The sub-processor 180 may generate data frames to the main processor 120 based on the 3D data and sensor data.

The camera module 190 may include at least one camera configured to take a 3D image. For this image, the camera module 190 may include a 3D camera and an RCG camera. The 3D camera and the RGB camera may be functionally connected to the sub-processor 180. The 3D camera is functionally connected to the sub-processor 180, and the RGB camera is functionally connected to the main processor 120.

The first and second external electronic devices 102 and 104 may be of the same or different type of electronic device as the type of the electronic device 101. The server 106 may include a group of one or more servers.

Some or all of operations performed in the electronic device 101 may be performed in one or more other electronic devices 102 or 104 or the server 106. When the electronic device 101 performs a certain function or service automatically or in response to a request, the electronic device 101 may request at least a portion of functions related to the function or service from another electronic device 102 or 104 or the server 106 instead of or in addition to performing the function or service for itself. Either of the other electronic devices 102 or 104 or the server 106 may perform the requested function or additional function, and may transfer a result of the performance to the electronic device 101. The electronic device 101 may additionally process the received result to provide the requested function or service. To this end, for example, a cloud computing technology, a distributed computing technology, or a client-server computing technology may be used.

Although FIG. 1 is directed to the electronic device 101 including the sub-processor 180 and the camera module 190, the configuration of the electronic device is not limited thereto. For example, the sub-processor 180 and the camera module 190 may be implemented in the form of a separate external device connected to the electronic device 101 through a wired/wireless link.

Figure 2:
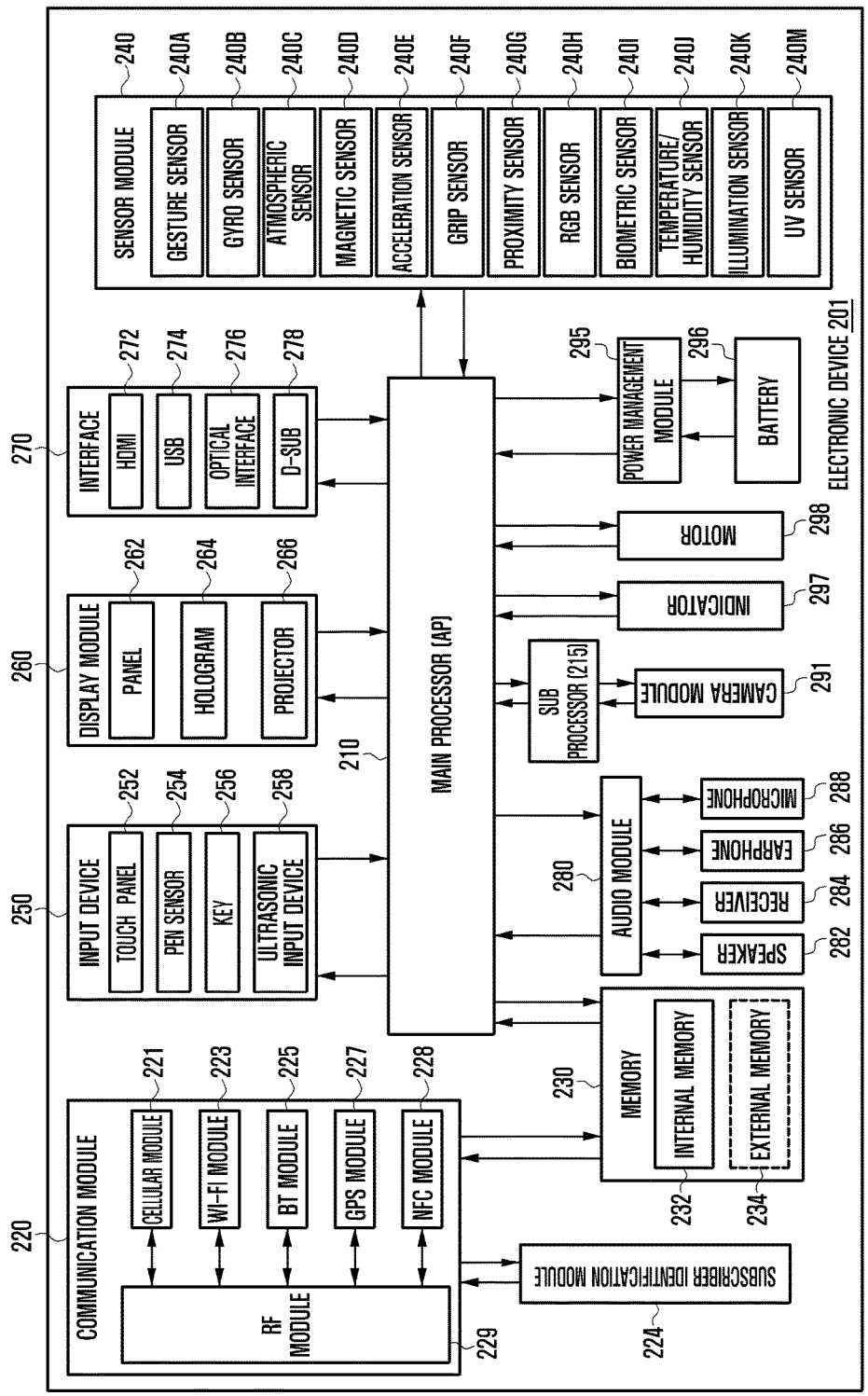
FIG. 2 is a block diagram illustrating an example configuration of an electronic device according to various example embodiments of the present disclosure.

FIG. 2 is a block diagram illustrating an example electronic device according to an example embodiment of the present disclosure.

Referring to FIG. 2, an electronic device 201 may form, for example, all or a part of the electronic device 101 illustrated in FIG. 1. the electronic device 201 may include at least one main application processor (AP) (e.g., including processing circuitry) 210, a sub-application processor (e.g., including processing circuitry) 215, a communication module (e.g., including communication circuitry) 220, a subscriber identification module (SIM) module 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The main AP 210 may include various processing circuitry configured to drive an operating system or applications, control a plurality of hardware or software components connected thereto, and also perform processing and operation for various data including multimedia data. The main AP 210 may include various processing circuitry, such as, for example, and without limitation, a dedicated processor, a CPU, or the like, and may be formed of a system-on-chip (SoC), for example. According to an embodiment of the present disclosure, the main AP 210 may further include a graphic processing unit (GPU). The GPU or image signal processor included in the main AP 210 may control normal screen display of the electronic device. In the case that the RGB camera is connected to the main AP 210, the GPU or the image signal processor included in the main AP 210 may be capable of processing the capture data received from the RGB camera.

The sub-application processor 215 may include various processing circuitry that generates 3D data requested by a predetermined application based on the raw data received from the camera module 291 and transmits the 3D data to the application via the main AP 210.

The communication module 220 (e.g., the communication interface 170) may perform a data communication with any other electronic device (e.g., the electronic device 104 or the server 106) connected to the electronic device 201 (e.g., the electronic device 101) through the network. According to an embodiment of the present disclosure, the communication module 220 may include various communication circuitry, such as, for example, and without limitation, a cellular module 221, a Wi-Fi module 223, a BT module 225, a GNSS module 227, an NFC module 228, and a radio frequency (RF) module 229.

The cellular module 221 may offer a voice call, a video call, a message service, an internet service, and the like through a communication network (e.g., LTE, LTE-A, CDMA, WCDMA, UMTS, WiBro, or GSM, etc.). Additionally, the cellular module 221 may perform identification and authentication of the electronic device in the communication network, using the SIM module 224. According to an embodiment of the present disclosure, the cellular module 221 may perform at least a part of functions that the main AP 210 can provide. For example, the cellular module 221 may perform at least part of a multimedia control function.

Each of the Wi-Fi module 223, the BT module 225, the GNSS module 227 and the NFC module 228 may include a processor for processing data transmitted or received therethrough. Although FIG. 2 shows the cellular module 221, the Wi-Fi module 223, the BT module 225, the GNSS module 227 and the NFC module 228 as different components, at least a part of these components may be contained in a single integrated circuit (IC) chip or a single IC package according to an embodiment of the present disclosure.

The RF module 229 may transmit and receive data, e.g., RF signals or any other electric signals. The RF module 229 may include a transceiver, a power amplifier module (PAM), a frequency filter, a low noise amplifier (LNA), and the like. Although FIG. 2 shows that the cellular module 221, the Wi-Fi module 223, the BT module 225, the GNSS module 227 and the NFC module 228 share the RF module 229, at least one of these components may perform transmission and reception of RF signals through a separate RF module according to an embodiment of the present disclosure.

The SIM module 224 may include, for example, an embedded SIM and/or a SIM card, and may include unique identification information (e.g., an integrated circuit card identifier (ICCID)) or subscriber information (e.g., international mobile subscriber identity (IMSI)).

The memory 230 may include an internal memory 232 and/or an external memory 234. The memory 230 may be, for example, the memory 130 illustrated in FIG. 1. The internal memory 232 may include, for example, at least one of a volatile memory (e.g., a dynamic random access memory (RAM) (DRAM), a static RAM (SRAM), a synchronous dynamic RAM (SDRAM), etc.), and a non-volatile memory (e.g., a one time programmable ROM (OTPROM), a programmable ROM (PROM), an erasable and programmable ROM (EPROM), an electrically erasable and programmable ROM (EEPROM), a mask ROM, a flash ROM, a not AND (NAND) flash memory, a Not OR (NOR) flash memory, etc.). According to an embodiment of the present disclosure, the internal memory 232 may be in the form of a solid state drive (SSD).

The external memory 234 may further include a flash drive, for example, a compact flash (CF), a secure digital (SD), a micro-secure digital (Micro-SD), a mini-secure digital (Mini-SD), an extreme digital (xD), a memory stick, and the like. The external memory 234 may be functionally connected to the electronic device 201 through various interfaces.

The sensor module 240 may measure physical quantity or sense an operating status of the electronic device 201, and then convert measured or sensed information into electric signals. The sensor module 240 may include, for example, at least one of a gesture sensor 240A, a gyro sensor 240B, an atmospheric sensor 240C, a magnetic sensor 240D, an acceleration sensor 240E, a grip sensor 240F, a proximity sensor 240G, a color sensor 240H (e.g., RGB (Red, Green, Blue) sensor), a biometric sensor 240I, a temperature-humidity sensor 240J, an illumination sensor 240K, and a UV (ultraviolet) sensor 240M. Additionally or alternatively, the sensor module 240 may include, e.g., an E-nose sensor, an EMG (electromyography) sensor, an EEG (electroencephalogram) sensor, an ECG (electrocardiogram) sensor, an IR (infrared) sensor, an iris scan sensor, or a finger scan sensor. Also, the sensor module 240 may include a control circuit for controlling one or more sensors equipped therein.

The input unit 250 may include various input circuitry, such as, for example, and without limitation, a touch panel 252, a digital pen sensor 254, a key 256, or an ultrasonic input unit 258. The touch panel 252 may recognize a touch input in a manner of capacitive type, resistive type, infrared type, or ultrasonic type. Also, the touch panel 252 may further include a control circuit. The touch panel 252 may further include a tactile layer. In this case, the touch panel 252 may offer a tactile feedback to a user.

The pen sensor 254 (e.g., a digital pen sensor), for example, may be implemented by using a method identical or similar to a method of receiving a touch input from the user, or by using a separate sheet for recognition. For example, a key pad or a touch key may be used as the keys 256. The ultrasonic input unit 258 enables the terminal to sense a sound wave by using a microphone 288 of the terminal through a pen generating an ultrasonic signal, and to identify data.

According to an embodiment of the present disclosure, the input device 250 may receive an input for designating one of the first band and the second band to be used for the function.

The display 260 (e.g., the display 150) may include a panel 262, a hologram 264, or a projector 266. The panel 262 may have a flexible, transparent or wearable form. The panel 262 may be formed of a single module with the touch panel 252. The hologram 264 may show a stereoscopic image in the air using interference of light. The projector 266 may project an image onto a screen, which may be located at the inside or outside of the electronic device 201. According to an embodiment of the present disclosure, the display 260 may further include a control circuit for controlling the panel 262, the hologram 264, and the projector 266.

The interface 270 may include various interface circuitry, such as, for example, and without limitation, an HDMI 272, a USB 274, an optical interface 276, or a D-subminiature (D-sub) 278. The interface 270 may be contained, for example, in the communication interface 170 shown in FIG. 1. Additionally or alternatively, the interface 270 may include, for example, a mobile high-definition link (MHL) interface, an SD card/multi-media card (MMC) interface, or an infrared data association (IrDA) interface.

The audio module 280 may perform a conversion between sounds and electric signals. At least part of the audio module 280 may be contained, for example, in the input/output interface 150 shown in FIG. 1. The audio module 280 may process sound information inputted or outputted through a speaker 282, a receiver 284, an earphone 286, or the microphone 288.

The camera module 291 is a device capable of obtaining still images and moving images. According to an embodiment of the present disclosure, the camera module 291 may include at least one image sensor (e.g., a front sensor or a rear sensor), a lens, an image signal processor (ISP), or a flash (e.g., a light emitting diode (LED) or xenon lamp).

The power management module 295 may manage electric power of the electronic device 201. The power management module 295 may include, for example, a power management integrated circuit (PMIC), a charger IC, or a battery gauge. The PMIC may be mounted to, for example, an IC or an SoC semiconductor. Charging methods may be classified into a wired charging method and a wireless charging method. A wireless charging type may include, for example, a magnetic resonance type, a magnetic induction type, or an electromagnetic type. Any additional circuit for a wireless charging may be further used such as a coil loop, a resonance circuit, or a rectifier. The battery gauge may measure the residual amount of the battery 296 and a voltage, current or temperature in a charging process. The battery 296 may store or create electric power therein and supply electric power to the electronic device 201. The battery 296 may be, for example, a rechargeable battery or a solar battery.

The indicator 297 may show thereon a current status (e.g., a booting status, a message status, or a recharging status) of the electronic device 201 or of a part thereof (e.g., the main AP 210). The motor 298 may convert an electric signal into a mechanical vibration. The electronic device 201 may include a specific processor (e.g., a GPU) for supporting a mobile TV. This processor may process media data that comply with standards of digital multimedia broadcasting (DMB), digital video broadcasting (DVB), or media flow.

Each of the above-described elements of the electronic device disclosed herein may be formed of one or more components, and the name of each element may vary according to the type of the electronic device. The electronic device disclosed herein may be formed of at least one of the above-discussed elements without some elements or with additional other elements. Some of the elements may be integrated into a single entity that still performs the same functions as the respective functions of such elements before integrated.

Although FIG. 2 is directed to the case where the sub-processor 215 and the camera module 291 are included in the electronic device, the configuration of the electronic device is not limited thereto. For example, the sub-processor 215 and the camera module 291 may be integrated into an external camera device that is connected to the electronic device 201 through a wired or wireless link. The external camera device may include various sensors (location sensor (e.g., GPS sensor), gyro sensor, geomagnetic sensor, and acceleration sensor) for collecting location and posture information.

Figure 3:
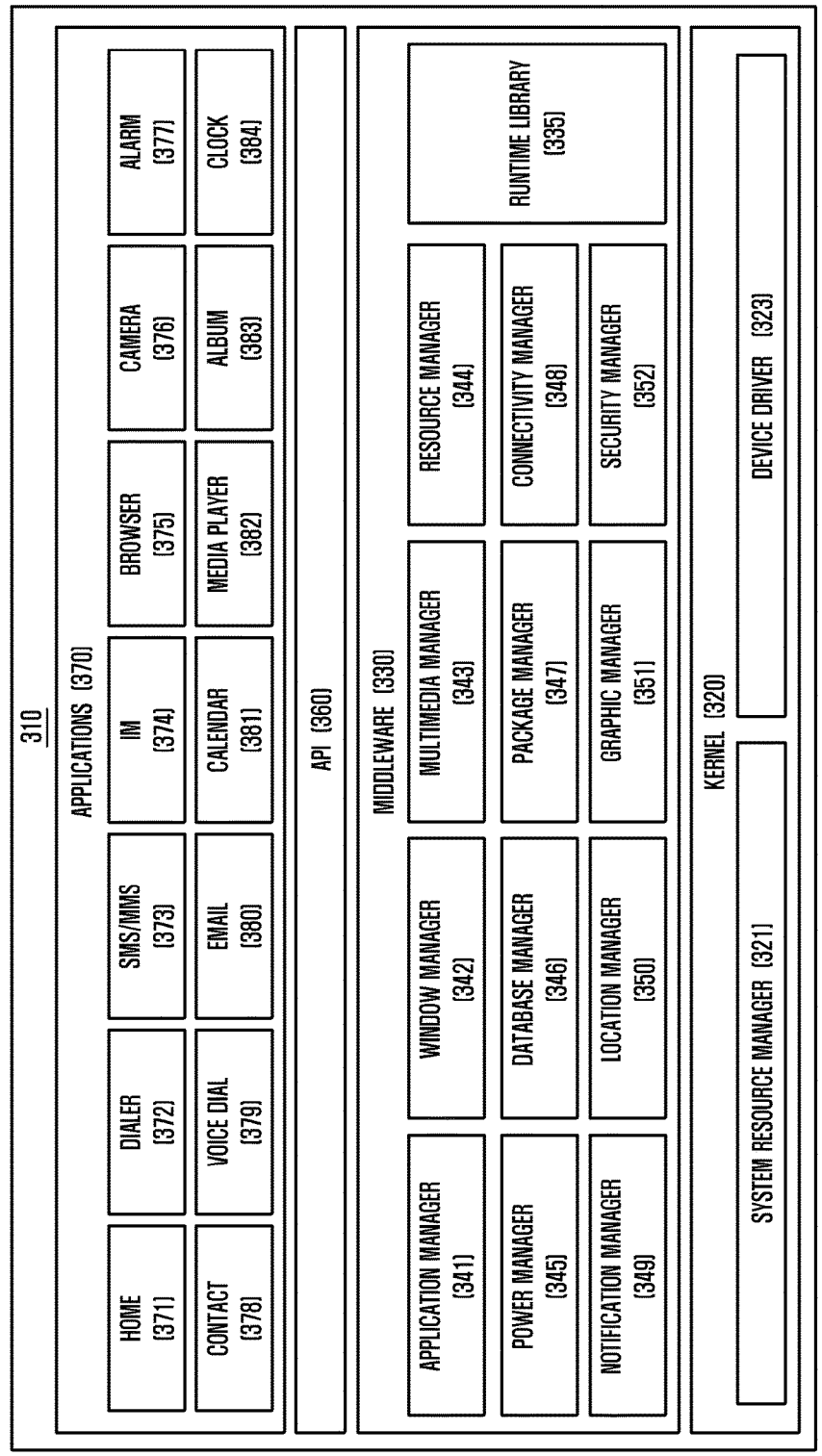
FIG. 3 is a block diagram illustrating an example configuration of a program module according to various example embodiments of the present disclosure.

FIG. 3 is a block diagram illustrating an example program module according to an example embodiment of the present disclosure.

Referring to FIG. 3, a program module 310 (e.g., the program 140) may include an operating system (OS) controlling resources related to the electronic device (e.g., the electronic device 101) and/or various applications (e.g., the application 147) that are driven on the operating system. The operating system may include, e.g., Android™, iOS™ Windows™, Symbian™, Tizen™, or Bada™.

The program module 310 may include, e.g., a kernel 320, middleware 330, an API 360, and/or an application 370. At least a part of the program module 310 may be preloaded on the electronic device or may be downloaded from any external electronic device (e.g., the electronic device 104 of the server 106).

The kernel 320 (e.g., the kernel 141 of FIG. 1) may include, e.g., a system resource manager 321 and/or a device driver 323. The system resource manager 321 may perform control, allocation, or recovery of system resources and may include a process managing unit, a memory managing unit, and/or a file system managing unit. The device driver 323 may include, e.g., a display driver, a camera driver, a BT driver, a shared memory driver, a USB driver, a keypad driver, a Wi-Fi driver, an audio driver, or an inter-process communication (IPC) driver.

The middleware 330 may provide various functions to the application 370 through the API 360 so that the application 370 may efficiently use limited system resources in the electronic device or provide functions jointly implemented by applications 370. The middleware 330 (e.g., middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and/or a security manager 352.

The runtime library 335 may include a library module used by a compiler to add a new function through a programming language while, e.g., the application 370 is being executed. The runtime library 335 may perform input/output management, memory management, and/or arithmetic functions.

The application manager 341 may manage the life cycle of at least one application of, e.g., the applications 370. The window manager 342 may manage graphical user interface (GUI) resources used on the screen. The multimedia manager 343 may determine formats utilized to play various media files and use a codec appropriate for a format to perform encoding or decoding on media files. The resource manager 344 may manage resources, such as source code of at least one of the applications 370, memory and/or storage space.

The power manager 345 may operate together with, e.g., a basic input/output system (BIOS) to manage battery or power and provide power information utilized for operating the electronic device. The database manager 346 may generate, search, and/or query a database to be used in at least one of the applications 370. The package manager 347 may manage installation or update of an application that is distributed in the form of a package file.

The connectivity manager 348 may manage wireless connectivity, such as, e.g., Wi-Fi or BT. The notification manager 349 may display or notify an event, such as a coming message, appointment, and/or proximity notification without interfering with the user. The location manager 350 may manage locational information on the electronic device. The graphic manager 351 may manage graphic effects to be offered to the user and their related user interface. The security manager 352 may provide various security functions utilized for system security and/or user authentication. When the electronic device (e.g., the electronic device 101) has telephony capability, the middleware 330 may further include a telephony manager for managing voice call and/or video call functions of the electronic device. The middleware 330 may include various functions of the above-described components. The middleware 330 may provide a specified module per type of the operating system to provide a differentiated function. Further, the middleware 330 may dynamically omit some existing components or add new components.

The API 360 (e.g., the API 145) may be a set of, e.g., API programming functions and may have different configurations depending on operating systems. For example, in the case of Android or iOS, one API set may be provided per platform, and in the case of Tizen, two or more API sets may be offered per platform.

The application 370 (e.g., the application processor 147) may include one or more applications that may provide functions such as, e.g., a home 371, a dialer 372, a short message service (SMS)/multimedia messaging service (MMS) 373, an instant message (IM) 374, a browser 375, a camera 376, an alarm 377, a contact 378, a voice dial 379, an email 380, a calendar 381, a media player 382, an album 383, or a clock 384, a health-care (e.g., measuring the degree of workout or blood sugar) (not shown), and/or environmental information (e.g., provision of air pressure, moisture, or temperature information) (not shown). The application 370 may include information exchanging application supporting information exchange between the electronic device (e.g., the electronic device 101) and an external electronic device (e.g., the electronic devices 102 and 104). Examples of the information exchange application may include, but is not limited to, a notification relay application for transferring specific information to the external electronic device, or a device management application for managing the external electronic device. For example, a notification relay application may include a function for relaying notification information generated from other applications of the electronic device (e.g., the SMS/MMS application, the email application, the health-care application, or the environmental information application) to the external electronic device (e.g., the electronic devices 102 and 104). Further, the notification relay application may receive notification information from, e.g., the external electronic device and may provide the received notification information to the user. A device management application may perform at least some functions of the external electronic device (e.g., the electronic device 102 or 104) such as, for example, turning on/off the external electronic device (or some components of the external electronic device), control brightness (or resolution) of the display, etc. The device management application may manage (e.g., install, delete, or update) an application operating in the external electronic device or a service (e.g., call service or message service) provided from the external electronic device.

The application 370 may include an application (e.g., a health-care application) selected depending on the attribute (e.g., as an attribute of the electronic device, the type of electronic device is a mobile medical device) of the external electronic device (e.g., the electronic devices 102 and 104). The application 370 may include an application received from the external electronic device (e.g., the server 106 or electronic devices 102 and 104). The application 370 may include a preloaded application or a third party application downloadable from a server. The names of the components of the program module 310 according to the shown embodiment may be varied depending on the type of operating system. At least a part of the program module 310 may be implemented in software, firmware, hardware, or in a combination of two or more thereof. At least a part of the programming module 310 may be implemented (e.g., executed) by e.g., a processor (e.g., the AP 210). At least a part of the program module 310 may include e.g., a module, a program, a routine, a set of instructions, a process, or the like for performing one or more functions.

Figure 4:
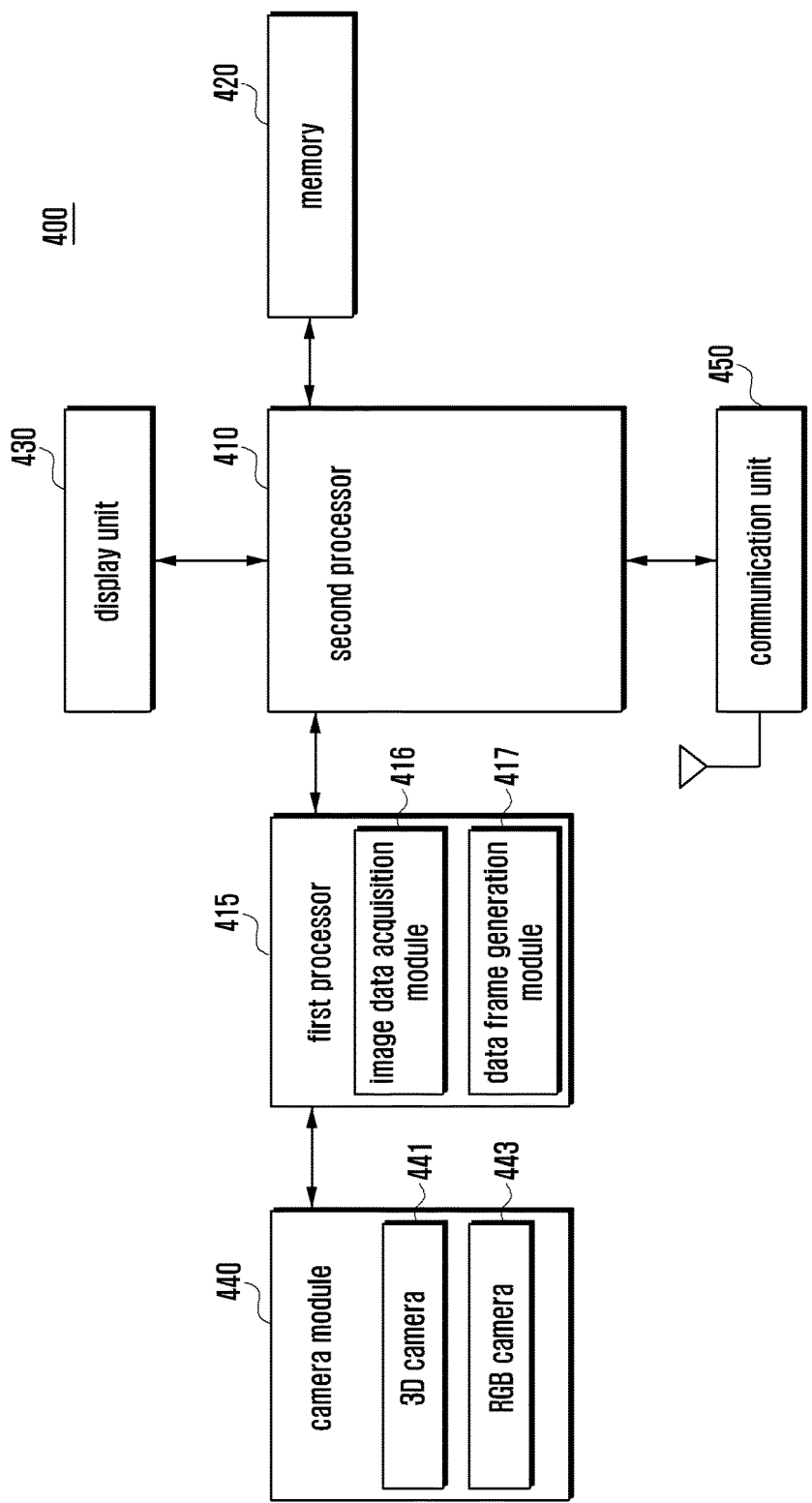
FIG. 4 is a block diagram illustrating an example configuration of an electronic device according to various example embodiments of the present disclosure.

FIG. 4 is a block diagram illustrating an example configuration of an electronic device according to various example embodiments of the present disclosure.

Referring to FIG. 4, the electronic device 400 (e.g., electronic device 101 and 201) includes a first processor (e.g., including processing circuitry) 415, a second processor (e.g., including processing circuitry) 410, a memory 420, a display unit 430, a camera module (e.g., including a camera) 440, and a communication unit (e.g., including communication circuitry) 450.

The first processor 415 (e.g., processor 180 of FIG. 1 and processor 215 of FIG. 2) may be an exclusive processor for processing the image data (e.g., raw data) acquired from the camera module 440. For example, the first processor 415 may include various processing circuitry, such as, for example, and without limitation, a dedicated processor, a CPU, or the like, and may be implemented in the form of an Application Specific Integrated Circuit (ASIC) that is capable of acquiring (extracting) 3D data predetermined in type, size, and resolution from the image data.

The first processor 415 may include an image data acquisition module 416 and a data frame generation module 417. The image data acquisition module 416 may acquire the image data from the camera module 440.

The data frame generation module 417 may generate data frames to be provided to the second processor 410 based on the image data. The data frame generation module 417 may generate the data frame by data type. For example, the data frame generation module 417 may acquire skeleton point coordinates, facial expression value, or RGB data value from the image data and generate frames in a data type-specific manner. The image processing method of the present disclosure in which the data frames are generated in a data type-specific manner is superior in data transmission efficiency to the conventional image processing method in which the data frames are generated regardless of data type.

The first processor 415 may generate a data frame including the location information or posture information (e.g., capture orientation (landscape or portrait) and motion information (rotation and movement). In order to accomplish this, the electronic device 400 may include various sensors (location sensor (e.g., GNSS), gyro sensor, geomagnetic sensor, and acceleration sensor). The data processing method according to an embodiment of the present disclosure processes various types of supplementary data along with the 3D data simultaneously in generating data frames and thus is capable of reducing processing latency in comparison with the conventional method, which generates 3D data and then performs additional processes on the 3D data.

The data frame generation module 417 may generate header information for the data frame as part of the operation of generating the data frame. For example, the data frame may include a header and data. The structure of the data frame is described in greater detail below with reference to FIG. 5.

The second processor 410 (e.g., main processor 120 of FIG. 1 and main processor 210 of FIG. 2) may control the overall operations of the electronic device 400 and signal flows among the internal function blocks of the electronic device 400. For example, the second processor 410 may include various processing circuitry, such as, for example, and without limitation, a dedicated processor, a Central Processing Unit (CPU), an Application Processor (AP), and a Communication Processor (CP), or the like. The second processor 410 may be implemented in the form of a single core processor or a multi-core processor.

According to an embodiment of the present disclosure, the second processor 410 may activate the camera module 440 and the first processor 415 upon detecting the execution of an application requiring 3D data. For example, the second processor 410 may activate the camera module 440 and the first processor 415 when a 3D game application utilizing movement and/or expression recognition is executed.

The second processor 410 may receive a request for transmission of data (e.g., depth data, facial expression data, RGB data, and skeleton data) required for an application running on the second processor 410. The second processor 410 may request to the first processor 415 for the corresponding data. For example, the second processor 410 may transmit the information (type, size, resolution, and the like) on the requested data and destination identification (ID) to the first processor 415 to request for the corresponding data transmission.

The second processor 410 may receive a data frame from the first processor 415 in response to the request. Upon receipt of the data frame, the second processor 410 may analyze the frame header to transmit corresponding data to the destination (application). For example, the second processor 410 may identify the destination based on the data type information included in the header. The second processor 410 may also identify the destination based on the destination ID included in the header. The second processor 410 forwards the received data to the destination without performing any extra process (change) thereon and thus does not incur overload. The second processor 410 is described in more detail later with reference to FIG. 7A.

The memory 420 (e.g., memory 130 of FIG. 1 and memory 230 of FIG. 2) may store the application programs associated with optional functions (such as audio playback function, still and motion picture playback function, broadcast playback function, Internet access function, text messaging function, gaming function, and navigation function) as well as the Operating System (OS) of the electronic device 400. The memory 420 may also store various types of data such as music data, video data, game data, movie data, and map data. According to an embodiment of the present disclosure, the memory 420 may store applications requiring 3D data.

The display unit 430 (e.g., display 160 of FIG. 1 and display 260 of FIG. 2) may display the information entered by or presented to a user as well as various menu items. The display unit 430 may be implemented with a curved display or a flexible display. The display unit 430 may be implemented with one of Liquid Crystal Display (LCD), Organic Light Emitting Diodes (LED), Active Matrix OLED (AMO-LED), Field Emission Display (FED), Electroluminescent Display (ELD), and Electrophoretic Display, or the like, but is not limited thereto.

The display unit 430 may include a touch panel, a display driver integrated circuit (DDI), a flexible printed circuit board (FPCB), a polarizer, and a window cover.

The display unit 430 may display various screens associated with the operation modes of the electronic device 400 such as home screen, menu screen, lock screen, game screen, webpage screen, call processing screen, and music and video playback screen.

The camera module 440 (e.g., camera module 190 of FIG. 1 and camera module 291 of FIG. 2) may include at least one camera to take a picture of an object. The camera module 440 is capable of taking a 3D image. The camera module 440 may transmit raw image data to the first processor 415. The camera module 440 may include a 3D camera 441 and an RGB camera 443.

The 3D camera 441 may acquire the information for 3D user movement and expression recognition (e.g., depth information, expression information, and skeleton information). The RGB camera 443 may acquire a 2D RGB image.

According to an embodiment, the RGB camera 443 may connect to the second processor 410. The second processor 410 may include a function block (e.g., GPU block) for processing RGB images.

The communication unit 450 (e.g., communication interface of FIG. 1 and communication module 220 of FIG. 2) may include various communication circuitry and be capable of communicating with other electronic devices. The communication unit 450 may be capable of communicating with another electronic device through a wired or wireless communication device. For example, the communication unit 450 may transmit 3D data to another electronic device under the control of the second electronic device 410. The 3D data may be the data (e.g., user's expression data) obtained by processing the raw data into the data type required for the first processor 415.

According to an embodiment, the first processor 415 and the camera module 440 may be included in an external camera device. The external camera device may be connected to the communication unit 450 through a wired/wireless link. At this time, the communication unit 450 may transmit a data frame transmission request message to the external camera device and receive a data frame from the external camera unit. In the case that the external camera device includes various sensors (location sensor (e.g., GPS), gyro sensor, geometric sensor, and acceleration sensor) for collecting location information and posture information, the data frame may include the sensor data of the external camera.

Although not illustrated in FIG. 4, the electronic device 400 may include various censor modules such as a broadcast reception module for receiving broadcast signals, a digital audio playback module (e.g., MP3 module), a short range communication module, a light sensor module, a motion sensor module, a fingerprint recognition sensor module, and an infrared sensor module. According to an embodiment of the present disclosure, the electronic device 400 may further include other components equal in functional level to the above described components.

According to various embodiments of the present disclosure, the electronic device may include the first and second processors. The first processor may acquire image data from the camera and generate data frames with the image data. The second processor may receive a data frame from the first processor, check attribute information associated with the data frame, and provide the information corresponding to the data frame to at least one of the applications associated with the attribute information.

According to various embodiments, the first processor may generate a header of the data frame as at least part of generating the data frame.

According to various embodiments, the data frame includes a header and data, and the header includes at least one of a data type field, a resolution field, a data length field, a changing frame field, a sensor information field, a destination ID field, and a time stamp field.

According to various embodiments, the first processor may include an ASIC that is capable of acquiring 3D data with a predetermined type, size, and resolution from the image data.

According to various embodiments, the first processor may transmit data frames that respectively include skeleton point coordinates, a facial expression value, and an RGB data value corresponding the image data.

According to various embodiments of the present disclosure, the first processor may generate type-specific data frames.

According to various embodiments, the second processor may request for a synchronized time configuration when a communication channel is established with the first processor.

According to various embodiments, the second processor may check the changing frame field of the header and, if the data is changed, the data contained in the data frame is transmitted to the destination indicated in the destination ID field.

According to various embodiments, if the data is not changed, the second processor may transmit to the destination a signal notifying that there is no data change.

According to various embodiments, the second processor may determine whether the difference between the time information included in the time stamp field of the header and its internal time information is greater than a predetermined threshold value and, if so, re-request for synchronized time configuration.

A description is made hereinafter of the data processing method according to an example embodiment of the present disclosure and is made under the assumption that the electronic device 400 is configured as shown in FIG. 4. However, the description made hereinafter may be applicable to the electronic device 100 of FIG. 1 and the electronic device 200 of FIG. 2.

Figure 5:
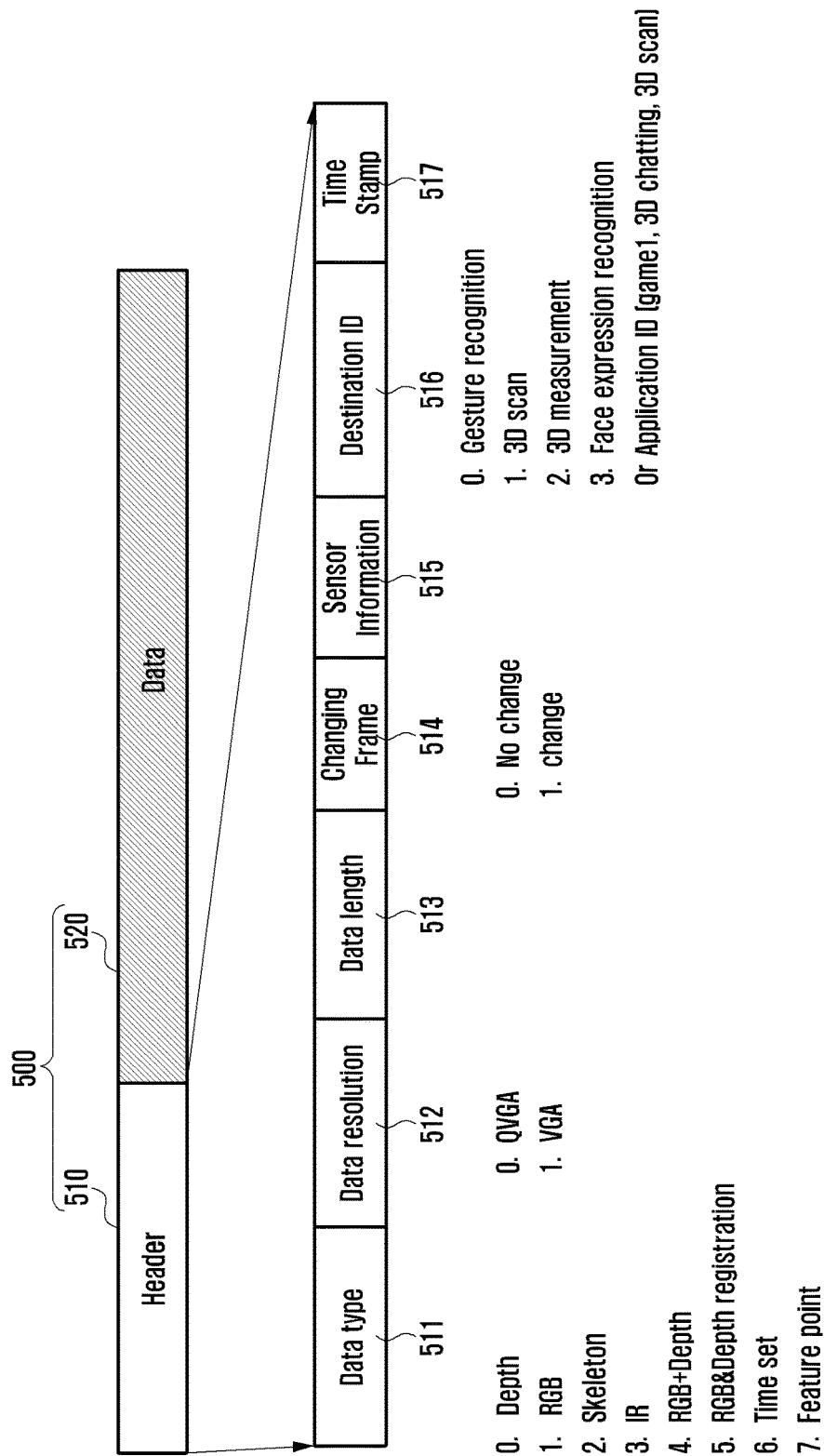
FIG. 5 is a diagram illustrating an example structure of a data frame according to various example embodiments of the present disclosure.

FIG. 5 is a diagram illustrating an example structure of a data frame according to various example embodiments of the present disclosure.

Referring to FIG. 5, the data frame 500 includes a header 510 and data 520.

The header 510 may include a data type field 511, a data resolution field 512, a data length field 513, a changing frame field 514, a sensor information field 515, a destination ID field 516, and a time stamp field 517.

The data type field 511 may contain the information indicating the type of the data. For example, the data type field may be set to 0 for depth data, 1 for RGB data, 2 for skeleton data, 3 for infrared data, 4 for RGB data and depth data, 5 for mapping data between RGB data and depth data, 6 for time configuration data for synchronization, or 7 for feature point data for facial expression recognition. However, this is an example, and the present disclosure is not limited thereby.

The data resolution field 512 may indicate the resolution of the image. For example, the data resolution field 512 may be set to 0 for QVGA resolution or 1 for VGA resolution. However, this is an example, and the present disclosure is not limited thereby.

The data length field 513 indicates the length of the data region 520. The changing frame field 514 indicates whether the any change is made in the previous data frame. For example, the changing frame field 514 may be set to 0 for no change or 1 for change. However, this is an example, and the present disclosure is not limited thereby.

The sensor information field 515 indicates whether the sensor information is updated when the sensors for acquiring location information or posture information (geomagnetic sensor, acceleration sensor, gyro sensor) are included. For example, the sensing information field 515 may include location information, orientation information (landscape or portrait), and motion information (rotation and movement).

The destination ID field 516 contains the information on the destination of the data. For example, the destination ID field 516 may be set to 0 for the gesture recognition program as the destination, 1 for the 3D scan program as the destination, 2 for the 3D measurement program as the destination, and 3 for the facial expression recognition program as the destination. However, this is an example, and the present disclosure is not limited thereby. For example, the destination ID field 516 may store the application ID. The application ID may be transmitted from the second processor 410 to the first processor 415 in response to a data transmission request.

The time stamp field 517 indicates the time when the data 520 is generated. The time stamp field 517 may be used for checking time synchronization between the first and second processors 415 and 410. The detailed description thereof is made later with reference to FIG. 6B.

According to an embodiment of the present disclosure, the data frame is not limited to the structure of FIG. 5. The fields constituting the header 510 may be changed in place, and some parts (e.g., changing frame field 514, sensor information field 515, and the time stamp field 517) may be omitted.

Figure 6A:
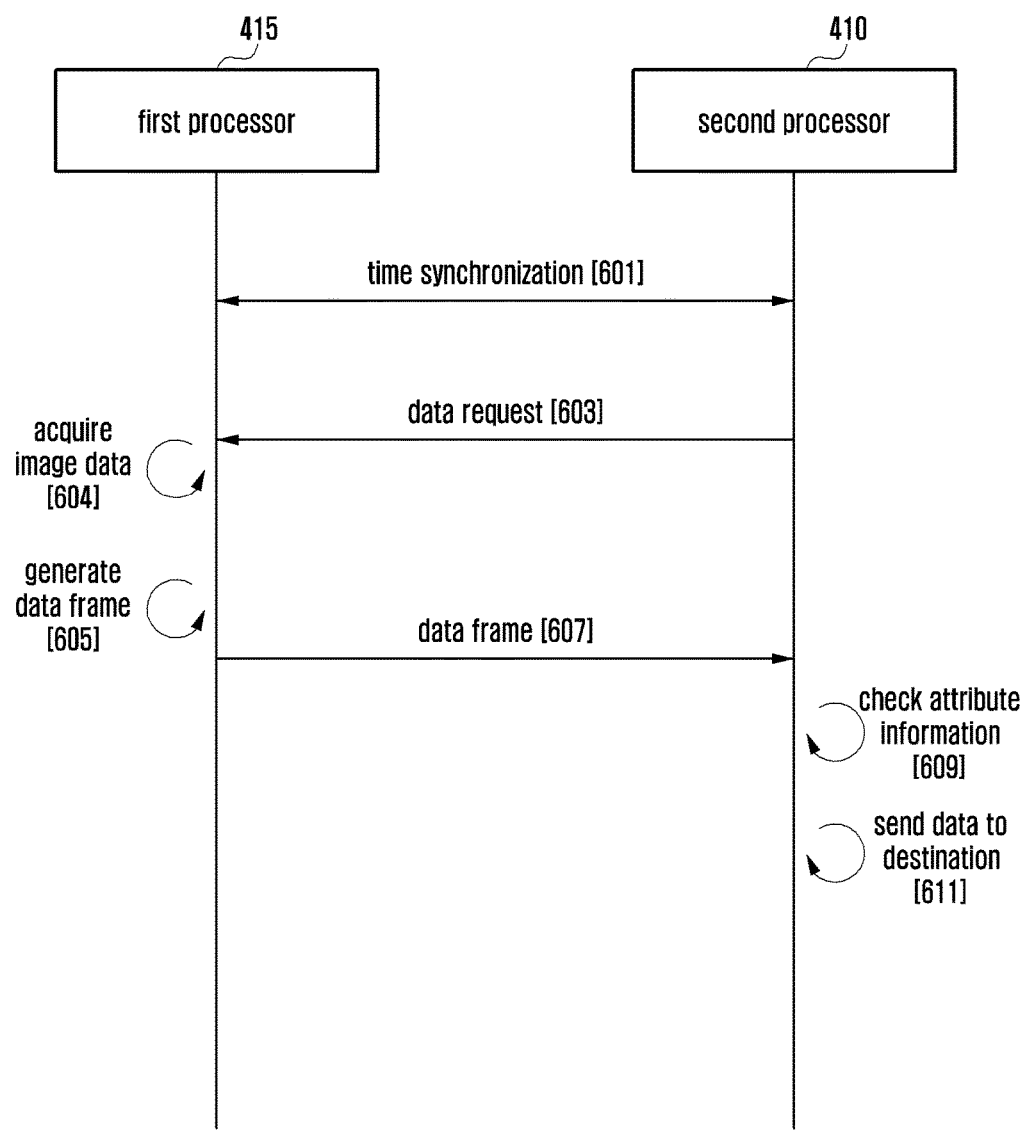
FIG. 6A is a signal flow diagram illustrating an example data processing procedure in an electronic device according to various example embodiments of the present disclosure.

FIG. 6A is a signal flow diagram illustrating an example data processing procedure in an electronic device according to various example embodiments of the present disclosure.

Referring to FIG. 6A, the first and second processors 415 and 410 may perform time synchronization at step 601. The time synchronization is triggered by activation of the first processor 415 upon detection of the execution of at least one application (e.g., game, photography, video recording, and 3D image-based chatting) using the 3D camera 441.

According to an embodiment, the time synchronization may be performed with the time stamp field 517 of FIG. 5. However, the present disclosure is not limited to the case of using the time stamp field, and time synchronization may be implemented with various methods. The time synchronization method is described in greater detail below with reference to FIG. 6B.

The second processor 410 may request to the first processor 415 for data required by an application at step 603. For example, the second processor 410 may transmit to the first processor 415 the data type, resolution, and destination ID required by the application to request for corresponding data value. The destination ID may be an identifier of one of a plurality of currently running applications. In the case that a plurality of subprograms of an application are running, the destination ID may be an identifier of a certain subprogram. The destination ID may also be an identifier of one of subprograms of an application.

The first processor 415 may acquire image data (raw data) from the camera module 440 at step 604. The first processor 415 may generate a data frame based on the image data at step 605. For example, the first processor 415 may process the image data received from the 3D camera 441 according to the required data format (e.g., type, size, and resolution) to generate the data frame. The first processor 415 may generate data type-specific data frames. For example, the first processor 415 may acquire skeleton point coordinates, facial expression value, and RGB data value from the image data to generate data frames for each type of data. The first processor 415 may generate header information for the data frame as part of generating the data frame. For example, the data frame may include a header and data. The structure of the data frame has been described with reference to FIG. 5; thus, a detailed description thereof is omitted herein.

The first electronic device 415 may transmit the generated data frame to the second processor 410 at step 607. The second processor 410 may check the attribute information of the received data frame at step 609. The second processor 410 may provide the corresponding destination (application) with the data based on the attribute information of the data frame at step 611. For example, the second processor 410 may provide at least one application corresponding to the attribute information with the information (data) corresponding to the data frame.

According to an embodiment, the second processor 410 may check the data type field 511 included in the header 510 of the data frame and determine the destination (application) of the data. For example, if the data type field 511 is set to 2, the second processor 410 may determine the application requiring the skeleton data as the destination. Also, if the destination ID field 516 is set to 1, the second processor 410 may determine a 3D scan application as the destination.

Figure 6B:
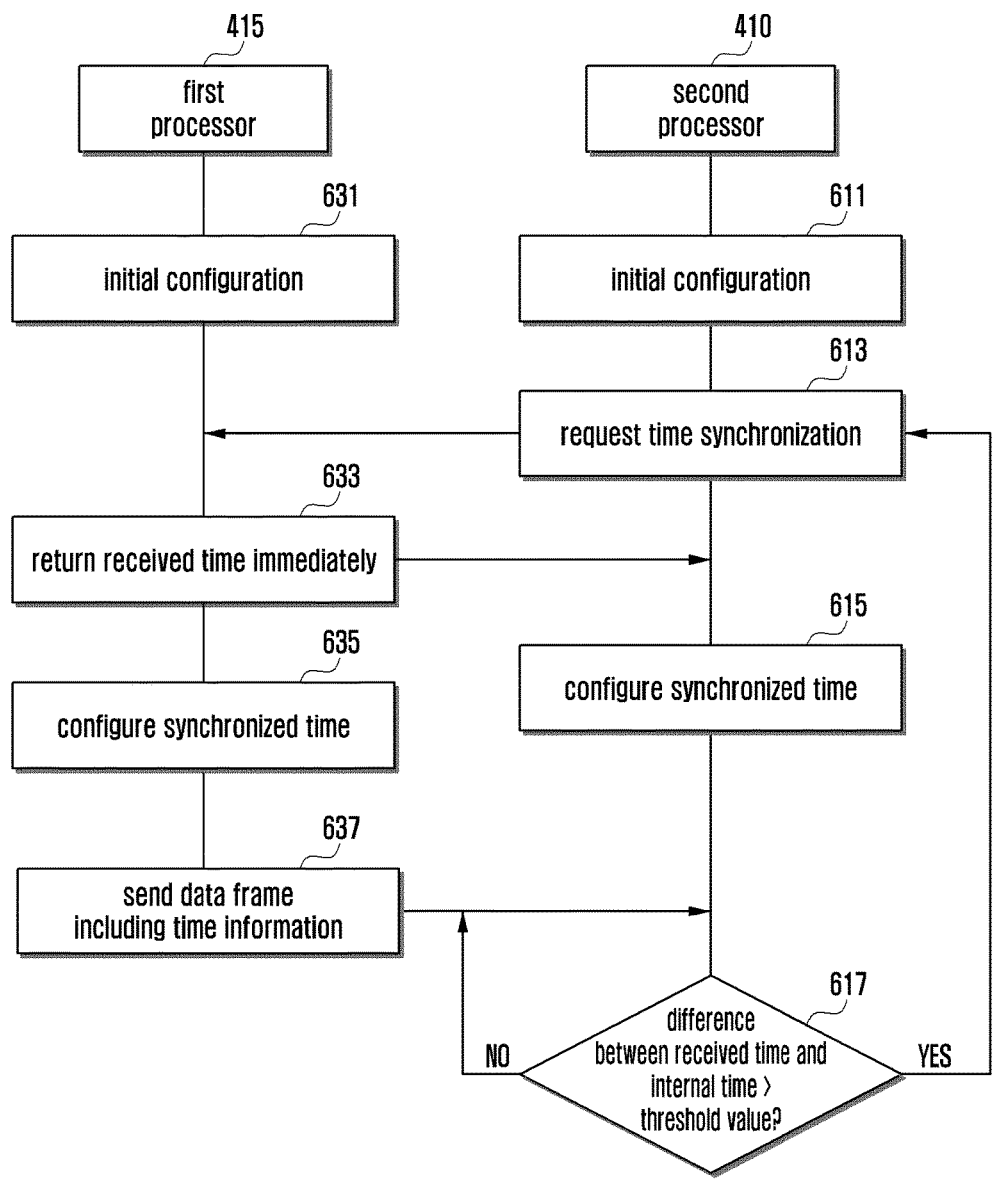
FIG. 6B is a flowchart illustrating an example synchronized time configuration procedure according to various example embodiments of the present disclosure.

FIG. 6B is a flowchart illustrating an example synchronized time configuration procedure according to various example embodiments of the present disclosure.

Referring to FIG. 6B, the first and second processors 415 and 410 may perform initialization configuration for establishing communication channels at steps 631 and 611 respectively.

The second processor 410 may transmit a time synchronization request to the first processor 415 at step 613. For example, if an application requiring time synchronization is activated, the second processor 410 may transmit a time and synchronization configuration request to the first processor 415.

The first processor 415 may return the received time to the second processor 410 immediately at step 633.

The first processor 415 may set (initialize) the synchronization time for data transmission to the received time at step 635. For example, the first processor 415 may reset (initialize) its timer to the received time.

The second processor 410 may set the synchronization time to the returned time at step 615. For example, the second processor 410 may reset (initialize) its timer to the returned time. In this way, if an application requiring time axis synchronization is activated, the first and second processors 415 and 410 may initialize the timer to the same time to acquire time axis synchronization.

The first processor 415 may transmit at step 637 the data frame of which header 510 has a time stamp field 517 filled with the time information.

The second processor 410 may determine whether the difference between the time included in the received data frame and its synchronization time is greater than a predetermined threshold value (e.g., 1 msec) at step 617. If this difference is greater than the threshold value, the second processor 410 may re-request for time synchronization at step 613. Otherwise, if the difference is equal to or less than the threshold value, the second processor 410 may repeat the operation of step 617.

As described above, the first and second processors 415 and 410 may maintain the time synchronization according to an embodiment of the present disclosure.

The time synchronization method of FIG. 6B is just an example, and the electronic device 400 according to various embodiments of the present disclosure may perform the time synchronization between the first and second processors 415 and 410 using various known methods other than the above-described method.

Figure 7A:
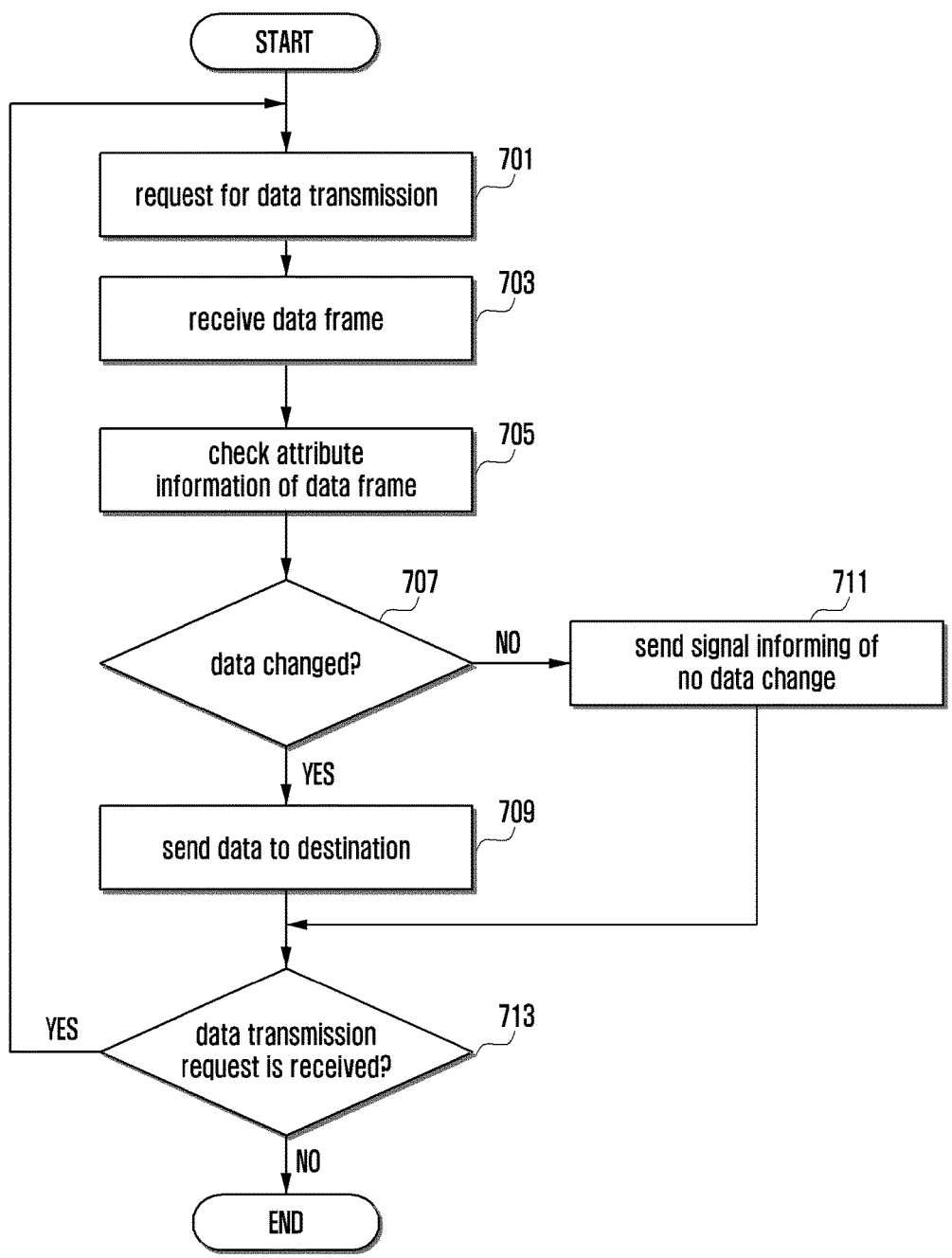
FIG. 7A is a flowchart illustrating an example data procession procedure of a processor according to various example embodiments of the present disclosure.

FIG. 7A is a flowchart illustrating an example data procession procedure of a processor according to various example embodiments of the present disclosure.

Referring to FIG. 7A, the second processor 410 of the electronic device 400 may request to the first processor 415 for data transmission at step 701. For example, the second processor 410 may transmit data type, resolution, and destination ID to the first processor 415 to request for the corresponding data.

The second processor 410 may receive a data frame from the second processor 415 at step 703.

The second processor 410 may check the attribute information of the received data frame at step 705. The second processor 410 may determine at step 707 whether the data has been changed based on the attribute information. For example, the second processor 410 may check the value of the changing frame field 514 of the header 510 of the data frame 500 to determine whether the data has been changed.

If it is determined that the data has been changed, e.g., if the changing frame field is set to 1, the second processor 410 may transmit data to the destination (e.g., application) at step 709. In detail, the second processor 410 may check the destination (application) of the data based on the destination ID field 516 of the header 510 of the data frame 500 and transmit the data to the destination.

If it is determined that the data has not been changed, e.g., if the changing frame field 514 is set to 0, the second processor 410 may transmit to the destination a signal (or data) indicating no data change at step 711. According to an embodiment, if it is determined that the data has not been changed, the second processor 410 may discard (or delete) and transmit no data to the destination.

According to an embodiment, the second processor 410 may determine at step 713 whether a data transmission request is received. If it is determined that a data transmission request is received, the second processor 410 returns the procedure to step 701. Otherwise if it is determined that no data transmission request is received, the second processor 410 may end the data processing procedure.

Figure 7B:
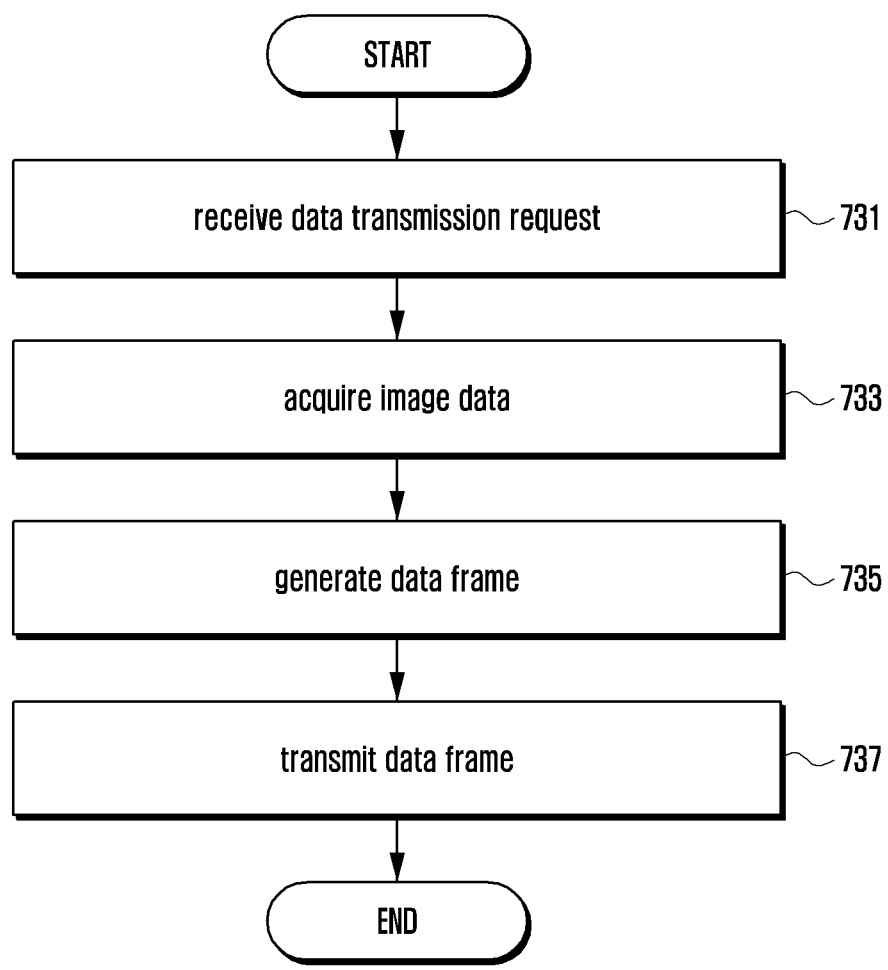
FIG. 7B is a flowchart illustrating an example data processing procedure of a processor according to various example embodiments of the present disclosure.

FIG. 7B is a flowchart illustrating an example data processing procedure of a processor according to various example embodiments of the present disclosure.

Referring to FIG. 7B, the first processor 415 of the electronic device 400 may receive a data transmission request at step 731. According to an embodiment, the data processing request may include a data type and a destination ID.

The first processor 415 may acquire image data from the camera module 440 at step 733.

The first processor 415 may generate a data frame with the image data at step 735. For example, the first processor 415 may calculate 3D data (e.g., skeleton data, action recognition data, expression recognition data, and depth data) based on the image data in response to the request and generate a data frame based on the calculated 3D data. According to an embodiment, the first processor 415 may extract different 3D data based on the data transmission request. For example, the first processor 415 may extract skeleton data concerning the user's action for an action recognition-based game or user's facial feature point data for an expression recognition-based game. The first processor 415 may extract skeleton data concerning the user's action and user's facial feature point data for a game requiring action recognition and expression recognition. The first processor 415 may generate a first data frame based on the skeleton data and a second data frame based on the feature point data.

The first processor 415 may transmit the generated data frames to the second processor 410 at step 737.

Figure 8A:
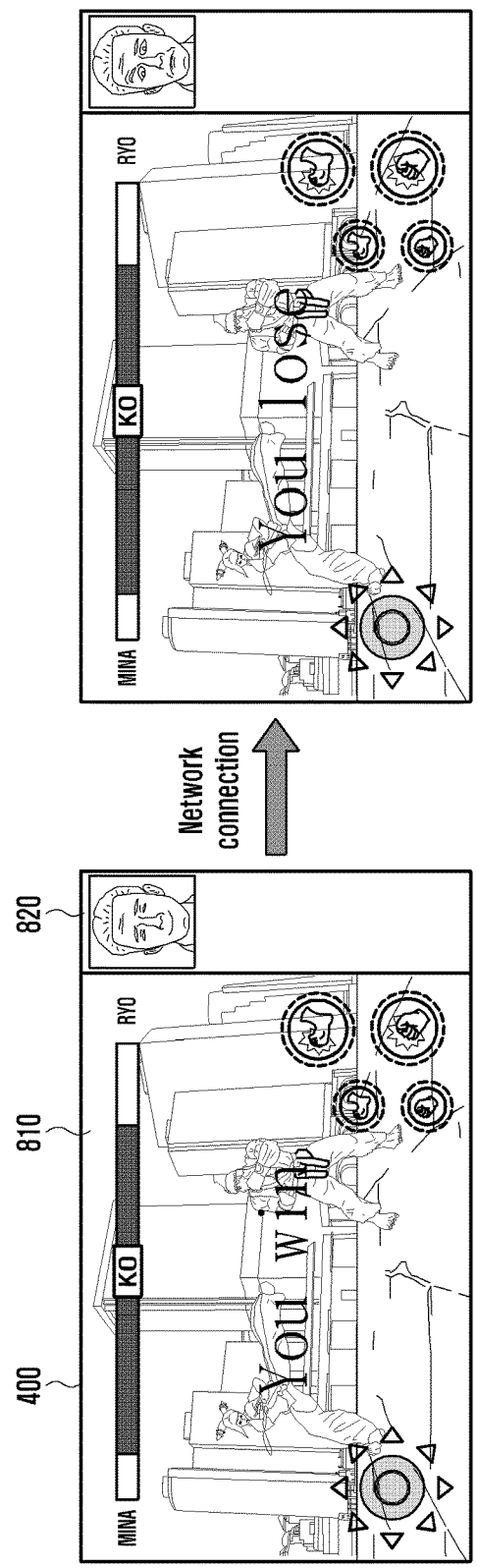
FIGS. 8A and 8B are diagrams illustrating an example data processing procedure according to various example embodiments of the present disclosure.
Figure 8B:
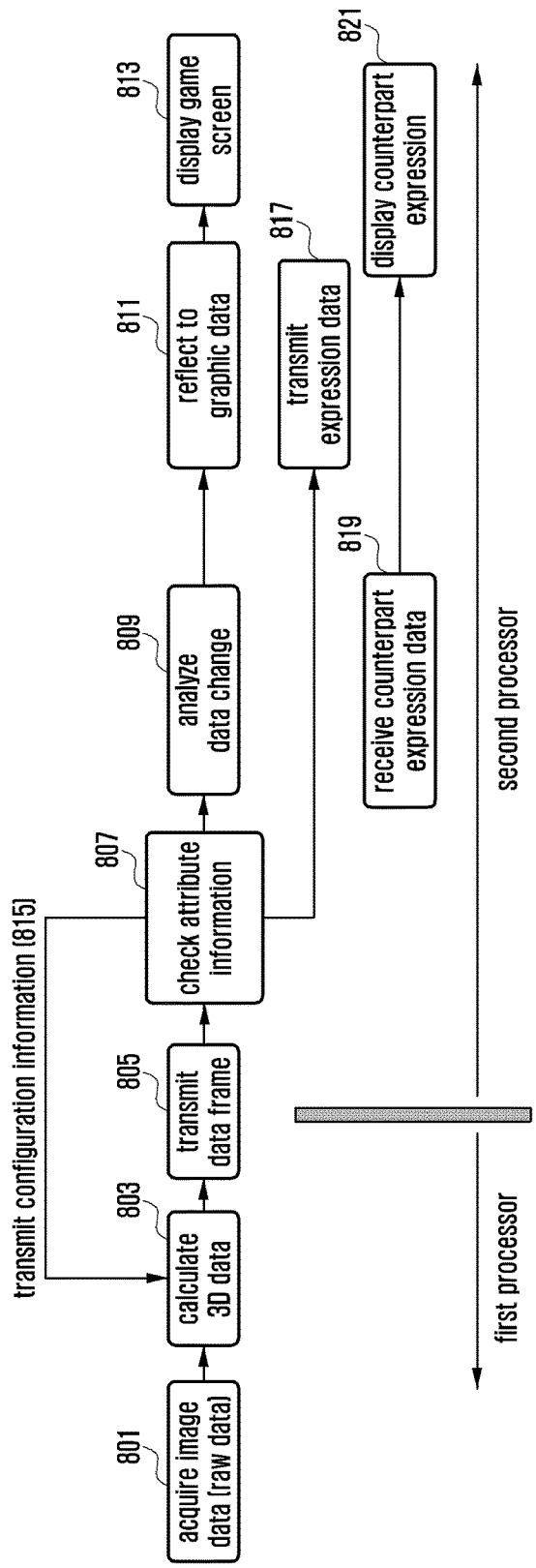

FIGS. 8A and 8B are diagrams illustrating an example data processing procedure according to various example embodiments of the present disclosure.

Referring to FIGS. 8A and 8B, the electronic device according to an embodiment of the present disclosure may provide a game requiring action recognition and expression. As illustrated in FIG. 8A, the electronic device 400 may support a fighting game in which players fight over a wired or wireless network. The electronic device 400 may display the game screen in a first zone 810 and the picture of the counterpart player in a second zone 820. According to an embodiment, the first zone 810 is controlled by the game application, and the second zone 820 is controlled by a chatting application.

Referring to FIG. 8B, the first processor 415 of the electronic device 400 may acquire image data (e.g., raw data) from the camera module 440 at step 801. The first processor 415 may calculate 3D data from the image data to generate a data frame at step 803. The data frame may be generated based on the configuration information transmitted by the second processor 410. The data frame may be generated by 3D data type. For example, the first processor 415 may generate the first data frame through an action recognition process and the second data frame through an expression recognition process. The action recognition process may include a user segment process for determining a user for action recognition, a skeleton extraction process for extracting skeleton data of the user, and an action analysis process for analyzing the action. The expression recognition process may include a feature point recognition process for recognizing a user's feature points, a feature point analysis process for analyzing feature points, and an expression analysis process for analyzing the expression based on the analysis result. The aforementioned processes are well-known to those skilled in the art; thus, detailed descriptions thereof are omitted herein.

The first processor 415 may transmit the data frames (e.g., the first and second data frames) to the second processor 410 at step 805.

The second processor 410 may check the attribute information of the data frame at step 807. For example, the second processor 410 may check the data type field or the destination ID field of the data frame.

If the data frame is of data being processed at the electronic device (e.g., first data frame associated with action recognition), the second processor 410 may determine at step 809 whether the data is changed. For example, the second processor 410 may determine whether the data is changed based on the changing frame field of the header of the data frame (e.g., first data frame).

If it is determined that the data is changed, the second processor 410 may reflect the data included in the data frame (e.g., first data frame) to the graphic data at step 811 for use in a game screen display. The second processor 410 may display the game screen in the first zone 810 at step 813 based on the graphic data reflecting the data included in the data frame (e.g., first data frame). For example, the second processor 410 may provide the game application with the data included in the data frame (e.g., first data frame) such that the game application reflects the user's action to the graphic.

The second processor 410 may transmit to the first processor 415 the configuration information necessary for generating the data frame at step 815. For example, the second processor 410 may transmit to the first processor 415 the information such as 3D data type, destination ID, and resolution.

If it is determined that the data frame is of data being processed at the counterpart device connected to the electronic device 400 (e.g., second data frame associated with expression recognition), the second processor 410 may transmit to the counterpart terminal the data (expression recognition data) included in the data frame (e.g., second data frame) at step 817.

The second processor 410 may receive expression data of the counterpart from the counterpart terminal at step 819. If the expression data of the counterpart is received, the second processor 410 may display at step 821 the picture of the counterpart in the second zone 820 based on the expression data of the counterpart. For example, the second processor 410 may provide the channel application with the counterpart's expression data to display the counterpart with the expression in the second zone 820.

Although the description is directed to an example where the expression recognition data is transmitted to the counterpart, the present disclosure is not limited thereto. In an example case of executing a game in which the expression of a game character is controlled based on the expression of the player, the second processor 415 may supply the expression recognition data to the game application (or subframe of processing expression recognition in the game application).

According to an embodiment of the present disclosure, if a game application that displays a game character of which the face reflects the player's face, the first processor 410 may process the image data acquired by the RGB camera 443 into a data frame. The second processor 415 may check the header of the data frame and send the image data included in the data frame to the game application.

According to various embodiments, the data processing method of the electronic device may include acquiring, at the first processor, image data from a camera; generating a data frame from the image data; providing the data frame to the second processor; checking, at the second processor, attribute information of the data frame; and supplying information about the data frame to at least one application corresponding to the attribute information among a plurality of applications based on the attribute information.

According to various embodiments, generating the data frame includes generating header information for the data frame.

According to various embodiments, the data frame includes a header and data, and the header includes at least one of a data type field, a resolution field, a data length field, a changing frame field, a sensor information field, a destination ID field, and a time stamp field.

According to various embodiments, generating the data frame includes processing skeleton point coordinates, facial expression value, and RGB data value corresponding to the image data into different data frames.

According to various embodiments, generating the data frame includes generating data frames by type of data.

According to various embodiments, the above method further includes setting a synchronized time between the first and second processors.

According to various embodiments, supplying the information includes checking a changing frame field of the header; determining whether data is changed; and transmitting, when the data is changed, the data included in the data frame to a destination indicated by the destination ID field.

According to various embodiments, supplying the information includes transmitting, when the data is not changed, to the destination a signal notifying that the data is not changed.

According to various embodiments, the above method further includes determining whether a difference between the time information stored in the time stamp field of the header and the internal time information is greater than a predetermined threshold value and re-requesting, when the difference is greater than the threshold, for synchronized time configuration.

As described above, the present disclosure is advantageous in terms of reducing the load of the main processor of a 3D camera-equipped electronic device with the addition of a separate processor for processing 3D data.

Also, the present disclosure is advantageous in terms of improving data transmission efficiency and reducing latency by generating a data frame in adaptation to application-specific data type.

The term "module" used in this disclosure may refer to a certain unit that includes one of hardware, software and firmware or any combination thereof. The module may be interchangeably used with unit, logic, logical block, component, or circuit, for example. The module may be the minimum unit, or part thereof, which performs one or more particular functions. The module may be formed mechanically or electronically. For example, the module disclosed herein may include at least one of a dedicated processor, a CPU, an ASIC (Application-Specific Integrated Circuit) chip, FPGAs (Field-Programmable Gate Arrays), and programmable-logic device, which have been known or are to be developed.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

Various example embodiments of the present disclosure described in the disclosure and the drawings are merely examples provided to easily describe the details of the present disclosure and to aid in understanding of the present disclosure, and do not limit the scope of the present disclosure. It will be apparent to those having ordinary skill in the technical field, to which the present disclosure pertains, that it is possible to practice other modified embodiments based on the technical idea of the present disclosure as well as the embodiments disclosed herein.

What is claimed is:

1. An electronic device, comprising:
a first processor configured to acquire image data from a camera and to generate a data frame based on the image data; and
a second processor configured to receive the data frame from the first processor, to check attribute information of the data frame, and to supply information on the data frame to at least one of a plurality of applications corresponding to the attribute information,
wherein the second processor is configured to request configuring time synchronization when a communication channel is established with the first processor.

2. The electronic device of claim 1, wherein the first processor is configured to generate header information of the data frame as at least part of generating the data frame.

3. The electronic device of claim 1, wherein the data frame comprises at least one of: a header and data, the data comprising a data type field, a resolution field, a data length field, a changing frame field, a sensor information field, a destination identifier field, and a time stamp field.

4. The electronic device of claim 3, wherein the second processor is configured to check the changing frame field of the header and to transmit, when the data is changed, data included in the data frame to a destination indicated by the destination identifier field.

5. The electronic device of claim 4, wherein the second processor is configured to transmit, when the data is not changed, a signal informing of no data change to the destination.

6. The electronic device of claim 3, wherein the second processor is configured to determine whether a difference between time indicated by the time stamp field of the header and an internal time of the second processor is greater than a predetermined threshold value and to re-request, when the difference is greater than the threshold value, configuration of the time synchronization.

7. The electronic device of claim 1, wherein the first processor comprises an Application-Specific Integrated Circuit (ASIC) configured to acquire 3D data having a predetermined type, a predetermined size, and a predetermined resolution from the image data.

8. The electronic device of claim 1, wherein the first processor is configured to process skeleton point coordinates, facial expression value, and Red-Green-Blue (RGB) data value corresponding to the image data into different data frames.

9. The electronic device of claim 1, wherein the first processor is configured to generate data frames by data type.

10. A data processing method of an electronic device, the method comprising:
   acquiring, at a first processor, image data from a camera;
   generating, at the first processor, a data frame based on the image data;
   providing, to a second processor, the data frame;
   checking, at the second processor, attribute information of the data frame; and
   supplying information on the data frame to at least one of a plurality of applications corresponding to the attribute information,
   wherein the second processor is configured to request configuring time synchronization when a communication channel is established with the first processor.

11. The method of claim 10, wherein generating the data frame comprises creating header information of the data frame.

12. The method of claim 10, wherein the data frame comprises a header and data, the data comprising a data type field, a resolution field, a data length field, a changing frame field, a sensor information field, a destination identifier field, and a time stamp field.

13. The method of claim 12, wherein supplying the information comprises:
   checking the changing frame field of the header; and
   transmitting, when the data is changed, data included in the data frame to a destination indicated by the destination identifier field.

14. The method of claim 13, wherein supplying the information comprises transmitting, when the data is not changed, a signal informing of no data change to the destination.

15. The method of claim 12, further comprising:
   determining, at the second processor, whether a difference between time indicated by the time stamp field of the header and an internal time of the second processor is greater than a predetermined threshold value; and
   re-requesting, when the difference is greater than the threshold value, configuration of the time synchronization.

16. The method of claim 10, wherein generating the data frame comprises processing skeleton point coordinates, facial expression value, and Red-Green-Blue (RGB) data value corresponding to the image data into different data frames.

17. The method of claim 10, wherein generating the data frame comprises generating data frames by data type.

18. A non-transitory computer-readable storage medium storing a program which, when executed by a an electronic device, causes the electronic device to perform operations comprising:
   acquiring, at a first processor, image data from a camera;
   generating, at the first processor, a data frame based on the image data;
   providing to a second processor the data frame;
   checking, at the second processor, attribute information of the data frame; and
   supplying information on the data frame to at least one of a plurality of applications corresponding to the attribute information,
   wherein the second processor is configured to request configuring time synchronization when a communication channel is established with the first processor.

* * * * *